(12) United States Patent
Bardack et al.

(10) Patent No.: US 8,671,314 B2
(45) Date of Patent: Mar. 11, 2014

(54) REAL-TIME DIAGNOSTICS PIPELINE FOR LARGE SCALE SERVICES

(75) Inventors: Avi Roitman Bardack, Redmond, WA (US); Paula Muna Batthish, Seattle, WA (US); Victor Boctor, Redmond, WA (US); Olexiy Karpus, Redmond, WA (US); Randall Lehner, Snoqualmie, WA (US); Pravjit Tiwana, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 136 days.

(21) Appl. No.: 13/107,455

(22) Filed: May 13, 2011

(65) Prior Publication Data

US 2012/0290880 A1 Nov. 15, 2012

(51) Int. Cl.
*G06F 11/00* (2006.01)
(52) U.S. Cl.
USPC ............................................. 714/37; 709/223
(58) Field of Classification Search
USPC .......................................................... 714/37
See application file for complete search history.

(56) References Cited

U.S. PATENT DOCUMENTS

| | | | |
|---|---|---|---|
| 6,662,318 B1 | 12/2003 | Baysah et al. | |
| 7,930,746 B1 | 4/2011 | Sheleheda et al. | |
| 2002/0083168 A1 | 6/2002 | Sweeney et al. | |
| 2004/0243692 A1* | 12/2004 | Arnold et al. | 709/220 |
| 2005/0216241 A1* | 9/2005 | Entin et al. | 703/2 |
| 2005/0262240 A1* | 11/2005 | Drees et al. | 709/224 |
| 2008/0189406 A1 | 8/2008 | Shen | |
| 2008/0243536 A1* | 10/2008 | Dworkin et al. | 705/1 |
| 2008/0246629 A1* | 10/2008 | Tsui et al. | 340/870.07 |
| 2008/0263195 A1 | 10/2008 | Kroll et al. | |
| 2009/0327353 A1* | 12/2009 | Zhuge et al. | 707/200 |
| 2010/0070807 A1 | 3/2010 | Hamilton, II et al. | |
| 2011/0078411 A1* | 3/2011 | Maclinovsky et al. | 712/30 |
| 2011/0307502 A1* | 12/2011 | Boctor | 707/758 |

OTHER PUBLICATIONS

Chandra, et al., Abstract entitled "Co-designing the Failure Analysis and Monitoring of Large-Scale Systems," Presented at the Hot-Metrics 2008 Workshop—Published Date: Nov. 9, 2010, pp. 10-15; 6 pgs. Obtained at: http://www-users.cs.umn.edu/~zhzhang/Papers/Co-Design-Hotmetrics08.pd.

Azemoon, et al. Paper entitled "Real-time Data Access Monitoring in Distributed, Multi-Petabyte Systems," Presented at the International Conference on Computing in High Energy Physics and Nuclear Physics, Sep. 2, 2007 in Victoria BC, Canada—Published Date: Feb. 2008; 11 pgs. Obtained at: http://www.slac.stanford.edu/cgi-wrap/getdoc/slac-pub-13108.pdf.

White Paper entitled "Commonsense Approach to Building Scalable Web Applications," Copyright date of Sep. 2008;—Retrieved Date: Apr. 6, 2011; 5 pgs. Obtained at: http://www.rapidsoftsystems.com/docs/webscale_rapidsoft.pdf.

International Search Report and Written Opinion in Application PCT/US2012/036847 mailed Nov. 30, 2012, 9 pages.

* cited by examiner

*Primary Examiner* — Kamini Patel
(74) *Attorney, Agent, or Firm* — Louise Bowman; Jim Ross; Micky Minhas

(57) ABSTRACT

Real-time diagnostics may be provided. A plurality of data feeds may be aggregated from at least one of a plurality of nodes. Upon determining that at least one element of at least one of the data feeds meets a trigger condition, an action associated with the trigger condition may be executed.

20 Claims, 3 Drawing Sheets

REAL-TIME DIAGNOSTICS PIPELINE FOR LARGE SCALE SERVICES

BACKGROUND

A real-time diagnostics pipeline may allow for reduce resolution time for service degradations in large-scale services. In some situations, performance, monitoring, and diagnostics of thousands of servers and millions of users interacting with the service from multiple geographies becomes extremely challenging. For example, identifying issues in real time to pin point the issue vectors and act upon them in real time is necessary to prevent service degradation. Conventional systems rely on distributed batch processing systems and are typically not online systems suitable self-rich enough to pin point scale and performance bottlenecks in real time. Furthermore, these systems do not provide rich enough forensics to pin point where the issue is. For example, conventional systems can identify that CPU usage is spiking but cannot provide details into what process is causing the CPU to spike.

SUMMARY

This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

Real-time diagnostics may be provided. A plurality of data feeds may be aggregated from at least one of a plurality of nodes. Upon determining that at least one element of at least one of the data feeds meets a trigger condition, an action associated with the trigger condition may be executed.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
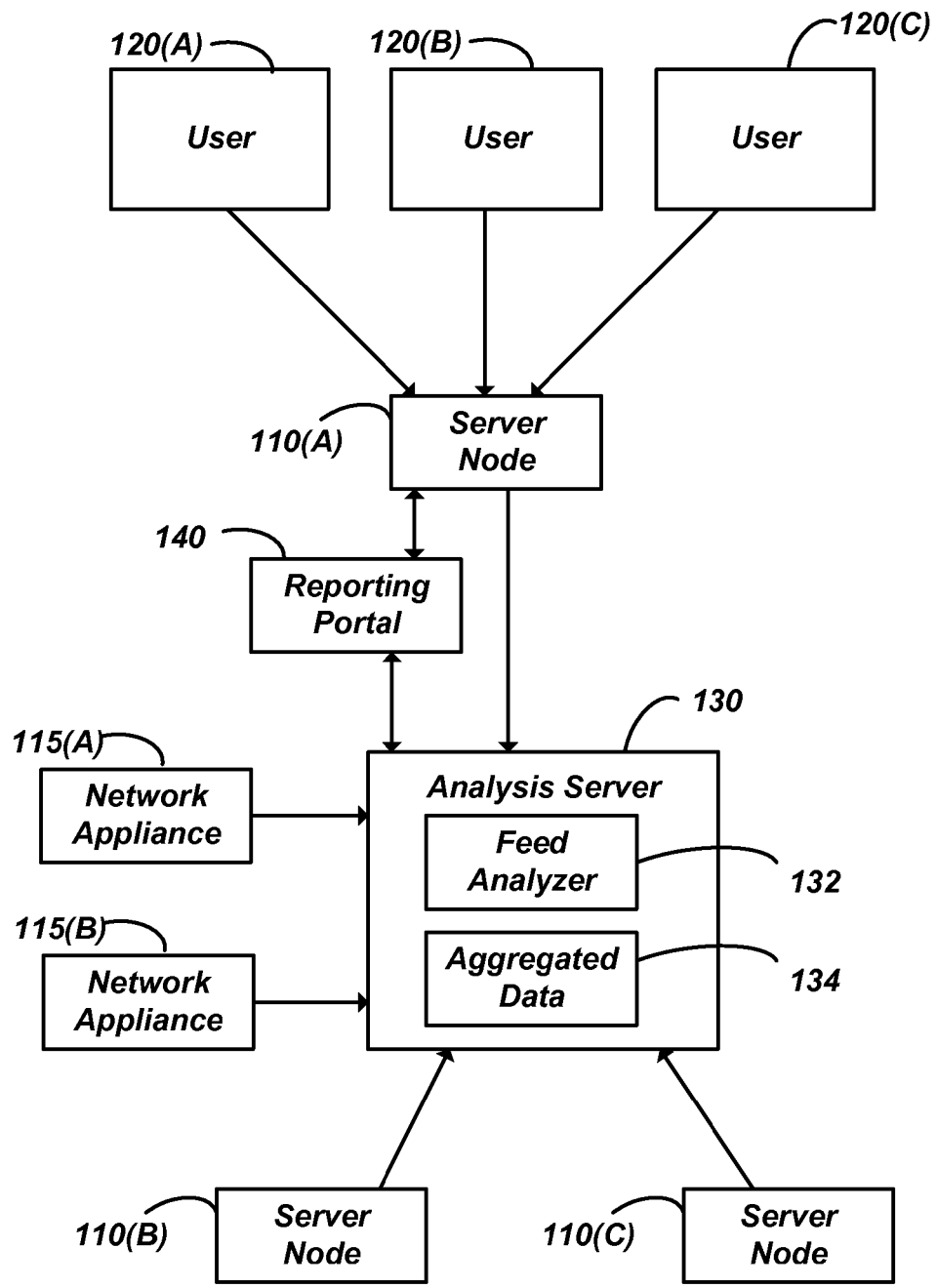
FIG. 1 is a block diagram of an operating environment.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention. Instead, the proper scope of the invention is defined by the appended claims.

A real-time diagnostics pipeline may be provided. The pipeline may comprise an extensible model that allows structured and non-structured data sources to be collected and aggregated. For example, multiple data feeds from multiple computers may be received and integrated for real time correlation. This may permit an easily scalable framework for the triangulation of issues for thousands of servers and millions of users. The model may provide real-time insight into aspects such as service usage and abuses, capacity utilization, and forensics such as F1 profiles, disk traces, memory dumps. This data may be integrated with a monitoring system to trigger alerts in real time. The collected data may also be analyzed according to business use cases, such as planning for data center expansions or identifying over served customer bases.

FIG. 1 is a block diagram of an operating environment 100 for providing a real-time diagnostic pipeline. Operating environment 100 may comprise a plurality of server nodes 110 (A)-(C), a plurality of network appliances 115(A)-(B), a plurality of user workstations 120(A)-(C), and an analysis server 130. Analysis server 130 may comprise a plurality of application and/or service components such as a feed analyzer 132 and an aggregated data storage 134. Operating environment 100 may further comprise a reporting portal 140. Consistent with embodiments of the invention, reporting portal 140 may be implemented as an application executing on analysis server 130.

Server nodes 110(A)-(C) may comprise application servers such as web servers, mail servers, database servers, video on demand servers, etc. Network appliances 115(A)-(B) may comprise purpose built computing appliances such as load balancers and/or routers. Feed analyzer 132 may be operative to receive data feeds from server nodes 110(A)-(C), network appliances 115(A)-(B), and/or user workstations 120(A)-(C). Such data feeds may be configured via reporting portal 140. For example, a user may use reporting portal 140 to configure analysis server 130 to receive a data feed associated with an event log of server node 110(A). The data feed may be formatted according to a standardized schema (e.g., an XML schema). Feed analyzer 132 may receive the incoming data feeds, compare them to configured trigger criteria, and/or store the data in aggregated data store 134.

Figure 2:
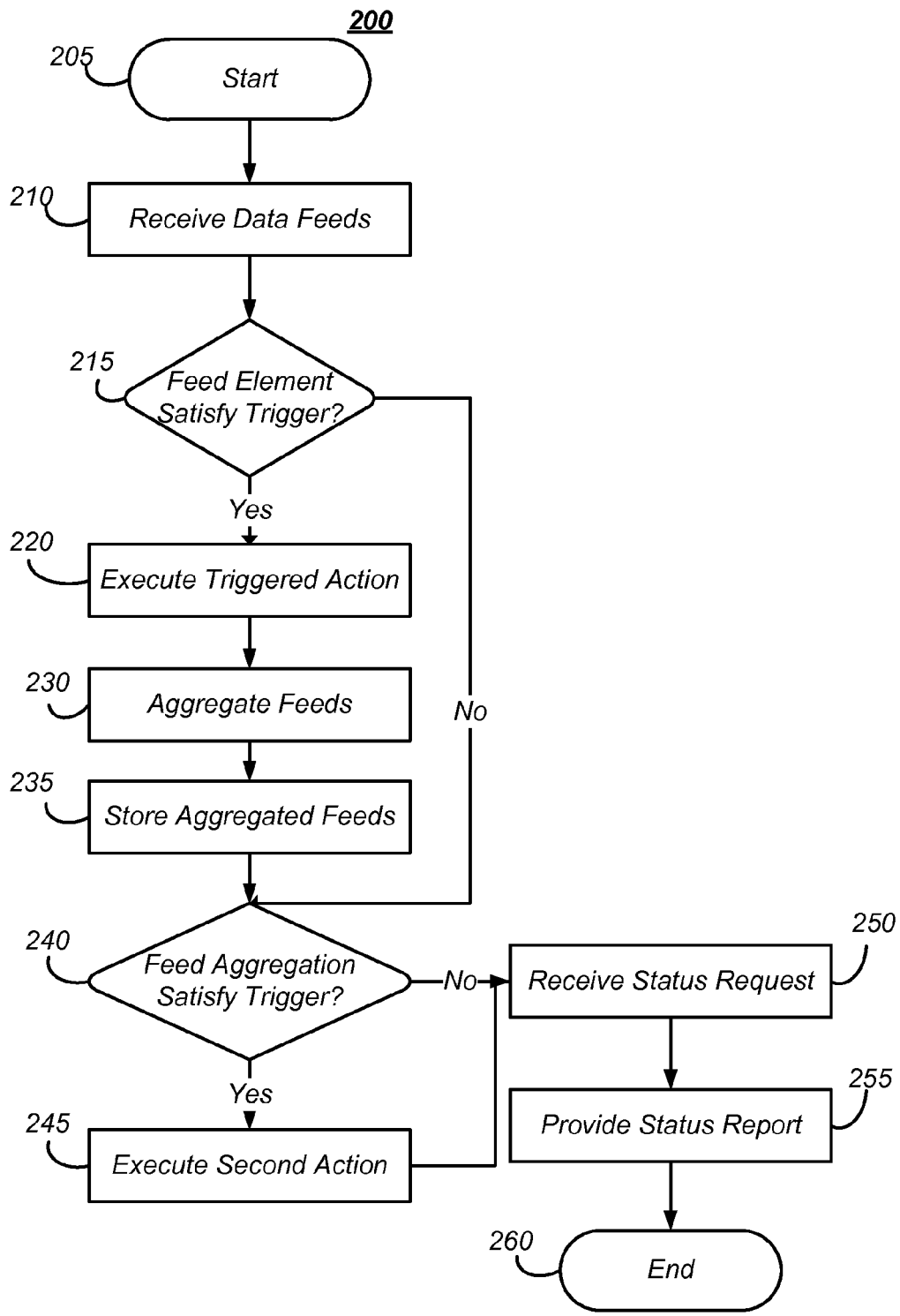
FIG. 2 is a flow chart of a method for providing real-time diagnostics.

FIG. 2 is a flow chart setting forth the general stages involved in a method 200 consistent with an embodiment of the invention for providing real time diagnostics. Method 200 may be implemented using a computing device 300 as described in more detail below with respect to FIG. 3. Ways to implement the stages of method 200 will be described in greater detail below. Method 200 may begin at starting block 205 and proceed to stage 210 where computing device 300 may receive a plurality of data feeds from each of a plurality of nodes. For example, each of the plurality of data feeds may be associated with a node usage condition, such as an application status, an event log, a log stream, a processor load, a memory state, an error event, a performance counter, a user activity monitor, a disk state, and a network state. A user activity monitor may be operative, for example, to process login attempts or track application usage such as web browsing history, emails sent, etc.

Method 200 may then advance to stage 215 where computing device 300 may determine whether at least one element associated with at least one of the plurality of data feeds satisfies a first trigger condition. The first trigger condition may be associated with a one-time occurrence, such as an application crash event associated with an event log data feed.

Method 200 may then advance to stage 220 where computing device 300 may execute an action associated with the first trigger condition. For example, the application crash event may result in triggering an alarm notification to an administrator and/or a restart command being issued to the crashed application.

Method 200 may then advance to stage 230 where computing device 300 may aggregate the plurality of data feeds. For example, feed analyzer 132 may collect event log feeds from user workstations 120(A)-(C) and combine similar events, such as failed login attempts.

Method 200 may then advance to stage 235 where computing device 300 may store the aggregated plurality of data feeds in a database. For example, feed analyzer 132 may store the combined event data in aggregated data store 134, which may comprise a log file and/or a database.

Method 200 may then advance to stage 240 where computing device 300 may determine whether the aggregation of the plurality of data feeds meets a second trigger condition. For example, a single failed login on user workstation 120(A) may satisfy the trigger condition but multiple failed logins on multiple workstations for the same user ID may trigger an alert.

Method 200 may then advance to stage 245 where computing device 300 may execute a second action associated with the trigger condition. For example, upon detecting a trend of failed logins associated with the same user ID, analysis server 130 may lock out that user ID and/or alert an administrator.

Method 200 may then advance to stage 250 where computing device 300 may receive a status request for at least one of the plurality of nodes. For example, a user of reporting portal 140 may request a status report on network appliance 115(A).

Method 200 may then advance to stage 255 where computing device 300 may provide a report of a plurality of current conditions for the at least one of the plurality of nodes according to the plurality of data feeds associated with the at least one of the nodes. For example, analysis server may retrieve data associated with the appropriate node (e.g., network appliance 115(A)) and provide a report of various conditions of that node, such as uptime, processor load, packets routed, users logged in, memory state, etc. Method 200 may then end at stage 260.

An embodiment consistent with the invention may comprise a system for providing real time diagnostics. The system may comprise a memory storage and a processing unit coupled to the memory storage. The processing unit may be operative to aggregate a plurality of data feeds from at least one of a plurality of nodes, determine if at least one element of at least one of the data feeds meets a trigger condition, and, in response to determining that the data meets the trigger condition, execute an action associated with the trigger condition. Each of the plurality of nodes may comprise a server computer, at least one of which may be operative to collect data associated with a plurality of user workstations. The processing unit may be further operative to aggregate the plurality of data feeds from each of the plurality of nodes and store the aggregate data feeds in a database, and the plurality of data feeds may each be associated with a different characteristic of each of the plurality of nodes, such as an application status, an event log, a processor load, a memory state, an error event, a performance counter, a user activity monitor, a disk state, and a network state. The processing unit may be further operative to analyzing the stored aggregated plurality of data feeds according to a business use case (such as extrapolating requirements for a new data center). The trigger condition may be associated with a one-time event and/or a data trend across a single machine and/or a plurality of machines.

Another embodiment consistent with the invention may comprise a system for providing real time diagnostics. The system may comprise a memory storage and a processing unit coupled to the memory storage. The processing unit may be operative to receive a plurality of data feeds from each of a plurality of nodes, determine whether at least one element associated with at least one of the plurality of data feeds satisfies a first trigger condition, and, if so, execute an action associated with the trigger condition. The processing unit may be further operative to aggregate the plurality of data feeds, determine whether the aggregation of the plurality of data feeds meets a second trigger condition, and, if so, execute a second action associated with the trigger condition. The trigger condition may comprise a behavior signature comprising a plurality of data elements associated with a known issue. The behavior signature may rely on different types of events to detect the occurrence of an issue. For example, a trend of failed logins followed by a spike in processor activity and new applications being executed may indicate a security breach.

The processing unit may be further operative to establish a new data feed. For example, a new application may be established on a node, and analysis server 130 may be configured to receive a data feed of events associated with the new application. The processing unit may be operative to convert the new data feed into a standardized schema and/or associate a new trigger condition (and associated action) with elements of the new data feed.

Yet another embodiment consistent with the invention may comprise a system for providing real time diagnostics. The system may comprise a memory storage and a processing unit coupled to the memory storage. The processing unit may be operative to receive a plurality of data feeds from each of a plurality of nodes and determine whether at least one element associated with at least one of the plurality of data feeds satisfies a first trigger condition associated with a one-time occurrence. If so, the processing unit may be operative to execute an action associated with the trigger condition. The processing unit may be further operative to aggregate the plurality of data feeds, store the aggregated plurality of data feeds in a database, determine whether the aggregation of the plurality of data feeds meets a second trigger condition, and, if so, execute a second action associated with the trigger condition. The processing unit may be further operative to receive a status request for at least one of the plurality of nodes and, in response, provide a report of a plurality of current conditions for the at least one of the plurality of nodes according to the plurality of data feeds associated with the at least one of the nodes.

Figure 3:
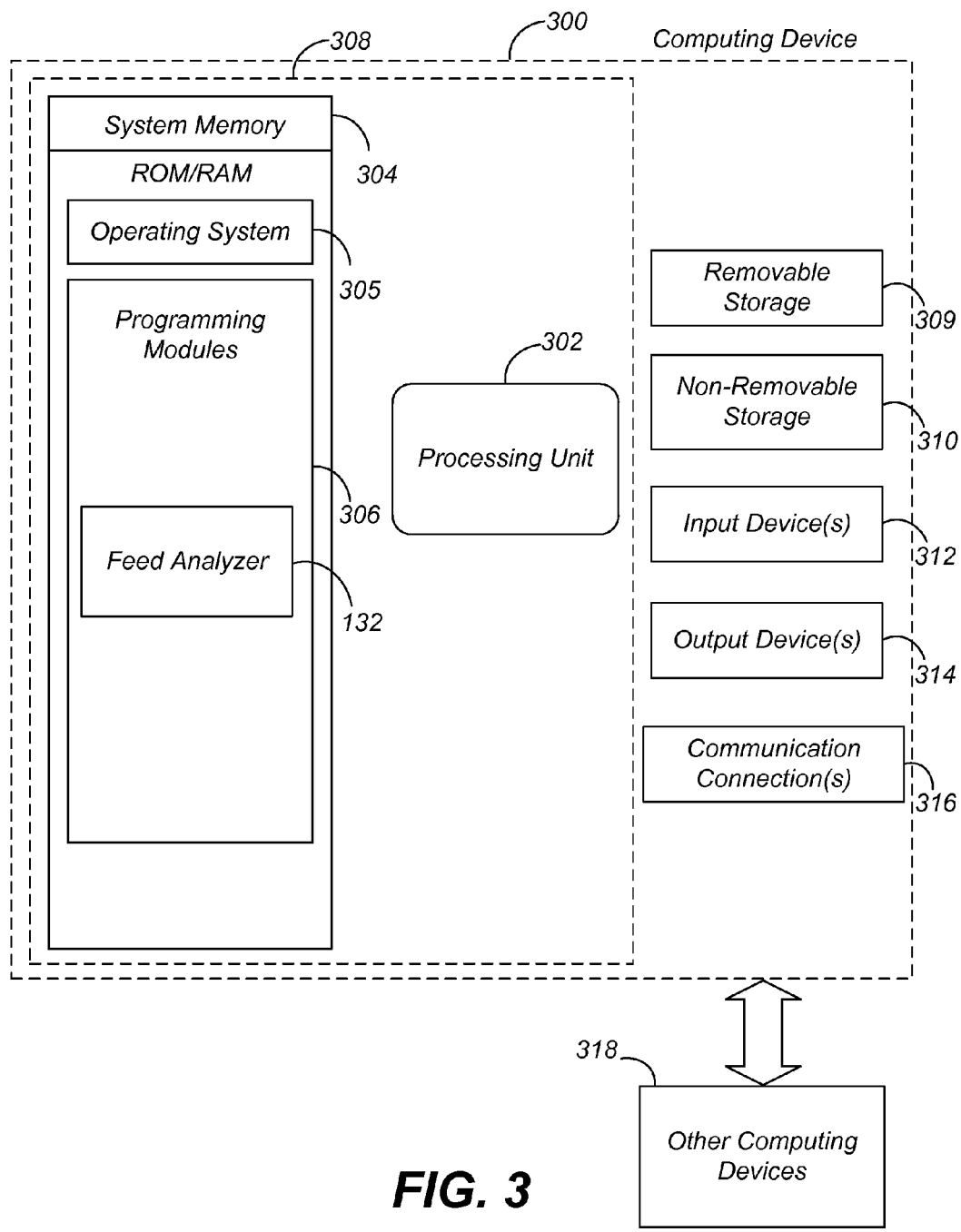
FIG. 3 is a block diagram of a system including a computing device.

FIG. 3 is a block diagram of a system including computing device 300. Consistent with an embodiment of the invention, the aforementioned memory storage and processing unit may be implemented in a computing device, such as computing device 300 of FIG. 3. Any suitable combination of hardware, software, or firmware may be used to implement the memory storage and processing unit. For example, the memory storage and processing unit may be implemented with computing device 300 or any of other computing devices 318, in combination with computing device 300. The aforementioned system, device, and processors are examples and other systems, devices, and processors may comprise the aforementioned memory storage and processing unit, consistent with embodiments of the invention. Furthermore, computing device 300 may comprise operating environment 100 as described above. Methods described in this specification may operate in other environments and are not limited to computing device 300.

With reference to FIG. 3, a system consistent with an embodiment of the invention may include a computing device, such as computing device 300. In a basic configuration, computing device 300 may include at least one processing unit 302 and a system memory 304. Depending on the configuration and type of computing device, system memory 304 may comprise, but is not limited to, volatile (e.g. random access memory (RAM)), non-volatile (e.g. read-only memory (ROM)), flash memory, or any combination. System memory 304 may include operating system 305, one or more programming modules 306, and may include feed analyzer 132. Operating system 305, for example, may be suitable for controlling computing device 300's operation. In one embodiment, programming modules 306 may include feed analyzer 132. Furthermore, embodiments of the invention may be practiced in conjunction with a graphics library, other operating systems, or any other application program and is not limited to any particular application or system. This basic configuration is illustrated in FIG. 3 by those components within a dashed line 308.

Computing device 300 may have additional features or functionality. For example, computing device 300 may also include additional data storage devices (removable and/or non-removable) such as, for example, magnetic disks, optical disks, or tape. Such additional storage is illustrated in FIG. 3 by a removable storage 309 and a non-removable storage 310. Computing device 300 may also contain a communication connection 316 that may allow device 300 to communicate with other computing devices 318, such as over a network in a distributed computing environment, for example, an intranet or the Internet. Communication connection 316 is one example of communication media.

The term computer readable media as used herein may include computer storage media. Computer storage media may include volatile and nonvolatile, removable and non-removable media implemented in any method or technology for storage of information, such as computer readable instructions, data structures, program modules, or other data. System memory 304, removable storage 309, and non-removable storage 310 are all computer storage media examples (i.e memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 300. Any such computer storage media may be part of device 300. Computing device 300 may also have input device(s) 312 such as a keyboard, a mouse, a pen, a sound input device, a touch input device, etc. Output device(s) 314 such as a display, speakers, a printer, etc. may also be included. The aforementioned devices are examples and others may be used.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

As stated above, a number of program modules and data files may be stored in system memory 304, including operating system 305. While executing on processing unit 302, programming modules 306 (e.g. feed analyzer 132) may perform processes including, for example, one or more of method 200's stages as described above. The aforementioned process is an example, and processing unit 302 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicant. The Applicant retains and reserves all rights in the code included herein, and grants permission to reproduce the material only in connection with reproduction of the granted patent and for no other purpose.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

What is claimed is:

1. A method for providing real-time diagnostics, the method comprising:
   receiving a plurality of data feeds from at least one of a plurality of nodes;
   determining if at least one element of at least one of the plurality of data feeds, prior to aggregating the plurality of data feeds, meets a first trigger condition;
   in response to determining that the at least one element of at least one of the plurality of data feeds, prior to aggregating the plurality of data feeds, meets the first trigger condition, executing an action associated with the first trigger condition;
   aggregating the plurality of data feeds;
   determining whether the aggregation of the plurality of data feeds meets a second trigger condition;
   in response to determining that the aggregation of the plurality of data feeds meets the second trigger condition, executing a second action associated with the second trigger condition; and
   providing a real-time report correlating and triangulating issues relating to the first trigger condition and the second trigger condition associated with the plurality of nodes including one or more of service usage, service abuses, capacity utilization, F1 profiles, disk traces, memory dumps.

2. The method of claim 1, wherein each of the plurality of nodes comprises at least one of the following: a server computer, a network appliance, a mobile device, and a user workstation.

3. The method of claim 1, wherein at least one of the plurality of nodes is operative to collect data associated with a plurality of user workstations.

4. The method of claim 1, further comprising:
   determining whether the aggregation of the plurality of data feeds meets the second trigger condition; and
   in response to determining that the aggregation of the plurality of data feeds meets the second trigger condition, executing the second action associated with the second trigger condition.

5. The method of claim 4, further comprising aggregating the plurality of data feeds from each of the plurality of nodes.

6. The method of claim 5, wherein the plurality of data feeds are each associated with a different characteristic of each of the plurality of nodes.

7. The method of claim 6, wherein each of the plurality of data feeds is associated with a node usage condition comprises at least one of the following: an application status, an event log, a log stream, a processor load, a memory state, an error event, a performance counter, a user activity monitor, a disk state, and a network state.

8. The method of claim 4, further comprising storing the aggregation of the plurality of data feeds in a database.

9. The method of claim 8, further comprising analyzing the stored aggregation of the plurality of data feeds according to a business use case.

10. The method of claim 1, wherein the first trigger condition is associated with a one-time occurrence in the at least one of the plurality of data feeds.

11. The method of claim 1, wherein the first trigger condition is associated with a trend associated with the at least one of the plurality of data feeds.

12. The method of claim 1, wherein the first trigger condition is associated with a trend associated with the aggregation of the plurality of data feeds.

13. A computer-readable storage device which stores a set of instructions which when executed performs a method for providing real-time diagnostics, the method executed by the set of instructions comprising:
   receiving a plurality of data feeds from each of a plurality of nodes, wherein each of the plurality of data feeds is associated with a node usage condition;
   determining whether at least one element associated with at least one of the plurality of data feeds, prior to aggregating the plurality of data feeds, satisfies a first trigger condition;
   in response to determining that the at least one element of at least one of the plurality of data feeds, prior to aggregating the plurality of data feeds, meets the first trigger condition, executing an action associated with the first trigger condition;
   aggregating the plurality of data feeds;

determining whether the aggregation of the plurality of data feeds meets a second trigger condition;

in response to determining that the aggregation of the plurality of data feeds meets the second trigger condition, executing a second action associated with the second trigger condition; and providing a real-time report correlating and triangulating issues relating to the first trigger condition and the second trigger condition associated with the plurality of nodes including one or more of service usage, service abuses, capacity utilization, F1 profiles, disk traces, memory dumps.

14. The computer-readable storage device of claim 13, wherein the first trigger condition comprises a behavior signature.

15. The computer-readable storage device of claim 14, wherein the behavior signature is associated with data tracked across at least a subset of the plurality of nodes.

16. The computer-readable storage device of claim 13, further comprising establishing a new data feed.

17. The computer-readable storage device of claim 16, further comprising converting the new data feed into a standardized schema.

18. The computer-readable storage device of claim 16, further comprising associating the new data feed with a new trigger condition.

19. The computer-readable storage device of claim 13, further comprising providing a report summarizing a plurality of conditions for at least one of the plurality of nodes.

20. A system for providing real-time diagnostics, the method executed by a set of instructions comprising:

a processing unit; and a memory storage that stores computer-readable instructions that, when executed by the processing unit, cause the system to:

receiving a plurality of data feeds from a plurality of nodes, wherein each of the plurality of data feeds is associated with a node usage condition;

determining whether at least one node usage condition associated with one of the plurality of data feeds, prior to aggregating the plurality of data feeds, satisfies a first trigger condition;

in response to determining that the one of the plurality of data feeds satisfies a first trigger condition meets the first trigger condition:

aggregating the plurality of data feeds from each of the plurality of nodes;

determining whether the aggregation of the plurality of data feeds meets a second trigger condition;

in response to determining that the aggregation of the plurality of data feeds meets the second trigger condition, executing an action associated with the second trigger condition; and providing a real-time report correlating and triangulating issues relating to the first trigger condition and the second trigger condition associated with the plurality of nodes including service usage, service abuses, capacity utilization, F1 profiles, disk traces, memory dumps.

* * * * *